United States Patent [19]

Dykstra

[11] Patent Number: 5,024,204
[45] Date of Patent: Jun. 18, 1991

[54] CAPACITIVE DISCHARGE IGNITION SYSTEM WITH CONTINUOUS TIMING ADVANCE

[75] Inventor: Richard A. Dykstra, Cedar Grove, Wis.

[73] Assignee: Briggs & Stratton Corporation, Wauwatosa, Wis.

[21] Appl. No.: 546,247

[22] Filed: Jun. 29, 1990

[51] Int. Cl.⁵ ............................................. F02P 3/08
[52] U.S. Cl. ............................... 123/602; 123/149 C
[58] Field of Search ............... 123/149 C, 599, 600, 123/602

[56] References Cited

U.S. PATENT DOCUMENTS

| 3,861,372 | 1/1975 | Shibukawa et al. | 123/149 C X |
|---|---|---|---|
| 3,861,373 | 1/1975 | Alwang et al. | 123/601 |
| 3,933,139 | 1/1976 | Beeghly | 123/599 |
| 3,941,111 | 3/1976 | Carmichael et al. | 124/599 X |
| 4,056,088 | 11/1977 | Carmichael | 123/599 X |
| 4,132,208 | 1/1979 | Yukawa | 123/149 C X |
| 4,157,702 | 6/1979 | Ogasawala et al. | 123/149 C |
| 4,170,206 | 10/1979 | Katsumata et al. | 123/602 |
| 4,413,608 | 11/1983 | Beeghly | 123/599 |
| 4,462,363 | 7/1984 | Nanjyo et al. | 123/427 |
| 4,473,050 | 9/1984 | Kondo et al. | 123/427 |
| 4,480,624 | 11/1984 | Anderson | 123/602 |
| 4,576,138 | 3/1986 | Wolf | 123/600 |
| 4,577,609 | 3/1986 | Donohue | 123/602 |
| 4,643,150 | 2/1987 | Miura et al. | 123/418 |
| 4,669,483 | 6/1987 | Ishii et al. | 123/418 |
| 4,817,577 | 4/1989 | Dykstra | 123/651 |

Primary Examiner—Tony M. Argenbright
Attorney, Agent, or Firm—Andrus, Sceales, Starke & Sawall

[57] ABSTRACT

A continuously advancing capacitive discharge ignition system for small internal combustion engines is disclosed in which both the negative and the positive half-cycles of the control winding output signal may be used for the continuous timing advance. Gating of the ignition SCR is controlled by applying a voltage divided first control signal to the SCR gate and a phase shifted second control signal to the SCR cathode. The predetermined voltage differential between the first control signal and the second control signal, which is reached progressively earlier with increased engine speed, is used to gate on the SCR earlier as speed increases to achieve continuous timing advance.

17 Claims, 1 Drawing Sheet

CAPACITIVE DISCHARGE IGNITION SYSTEM WITH CONTINUOUS TIMING ADVANCE

BACKGROUND OF THE INVENTION

This invention relates to internal combustion and more particularly to small internal combustion engines of the type used to power lawn mowers, snow blowers, generators and the like.

Several types of ignition systems are known for small internal combustion engines. One such type is the capacitive-discharge ignition system, wherein a charge capacitor is charged from a current source such as a charging winding, and is discharged in response to the gating on of a silicon controlled rectifier (SCR) in series with the charge capacitor and the primary winding of an output coil. The gating on of the SCR controls discharge of the capacitor through the output coil, which triggers ignition firing.

Since the gating of the SCR in effect controls the timing of ignition firing, control of SCR gating may be used to retard ignition timing when the engine runs at low speeds upon starting up to 1200 rpm, and to advance ignition timing when the engine runs at higher speeds. Unfortunately, typical prior art SCR gating control techniques are complicated and expensive in that they often require additional trigger coils or a number of semiconductor switches. Moreover, such gating control circuits often provide for advancing in a plurality of steps, and not for continuous advance over a wide range of engine speeds.

SUMMARY OF THE INVENTION

An advancing capacitive discharge ignition system for an internal combustion engine is disclosed which comprises a charge capacitor, an ignition SCR, a control winding for generating an alternating signal, and a gate control means for receiving the alternating signal and for gating on the ignition SCR during the positive half-cycle of the alternating signal at low engine speeds starting at about 1200 rpm and during the negative half-cycle of the alternating signal at higher engine speeds. The ignition system may also comprise a smoothing means such as a resistor or a capacitor in parallel with the control winding for smoothing the alternating signal.

In a preferred embodiment, the gate control means includes a circuit means for applying a first control signal functionally related to the control winding signal to the gate of the ignition SCR and a phase shifter means for receiving a second signal functionally related to the control winding signal and for outputting a second control signal after a time delay period to the cathode of the ignition SCR. The ignition SCR is gated on to discharge the charge capacitor when the voltage differential between the first control signal and the second control signal reaches a predetermined value; that is, when the voltage differential between the gate and cathode of the ignition SCR is greater than a predetermined voltage. Since this voltage differential occurs progressively earlier with increased engine speed, substantially continuous timing advance is achieved. The circuit means preferably includes a voltage divider, and the phase shifter means preferably includes a second capacitor.

The second capacitor receives and is charged by the second signal during the negative-going portion of the alternating signal, and discharges to output the second control signal during the positive-going portion of the alternating signal.

The angular delay after which the phase shifting means outputs the second control signal is greater at lower engine speeds starting at about 1200 rpm than at higher engine speeds to achieve continuous timing advance.

It is a feature and advantage of the present invention to provide a capacitive discharge ignition system with continuous timing advance.

It is yet another feature and advantage of the present invention to provide a simple and inexpensive capacitive discharge ignition system for small internal combustion engines.

It is yet another feature and advantage of the present invention to provide continuous timing advance over a wide angle of the control winding signal by using both the positive and negative half cycles of that signal.

It is yet another feature and advantage of the present invention to provide continuous timing advance in a capacitive-discharge ignition system by controlling the switching point of the ignition SCR.

These and other features of the present invention will be apparent to those skilled in the art from the following detailed description and the attached drawings, in which:

DETAILED DESCRIPTION OF THE PREFERRED EMBODIMENT

The present invention is a low-cost, simple capacitive-discharge ignition system which provides for continuous timing advance over a wide range of engine speeds using relatively few, simple components. The timing advance is achieved by using both the negative and positive half-cycles of the control winding output signal to theoretically enable substantially continuous timing advance from the peak of the positive half-cycle back to the peak of the negative half-cycle. Typical prior art devices use either—but not both—the positive or the negative half-cycle of the control winding output signal for continuous timing advance. Thus, the present invention permits a wider control angle than other typical prior art ignition systems.

The timing of ignition firing is controlled according to the present invention by a gate control means that receives the alternating signal from the control winding and gates on the ignition SCR during the positive half-cycle at low engine speeds starting at about 1200 rpm and during the negative half-cycle at high engine speeds up to about 3600 rpm or higher. The gate control means includes a circuit means, preferably consisting of a voltage divider, that generates a first control signal functionally related to the control winding signal and applies that first control signal to the gate of the ignition SCR. The gate control means also includes a phase shifter means, preferably a second capacitor, that receives a second signal functionally related to the control winding signal and applies a second control signal after an angular delay to the cathode of the ignition SCR. The ignition SCR is gated on to discharge the ignition system's charge capacitor when the voltage differential between the first control signal—the ignition SCR gate voltage —and the second control signal—the ignition SCR cathode voltage—reaches a sufficient, predetermined value to turn on the ignition SCR.

Figure 2:
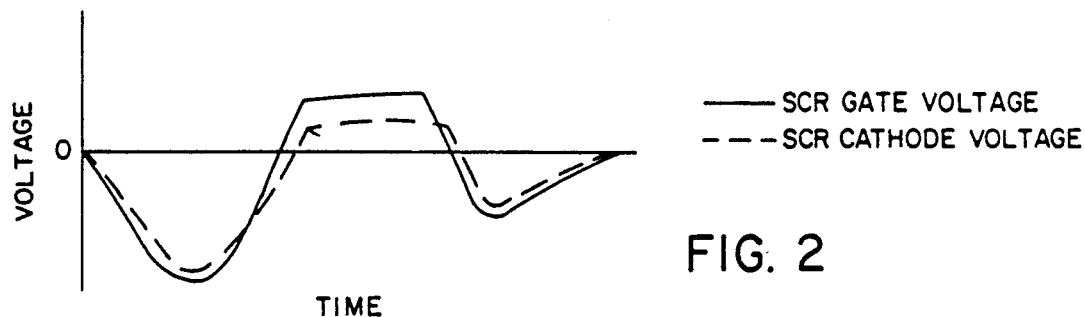
FIG. 2 is a graph depicting both the SCR gate voltage and the SCR cathode voltage versus time.

FIG. 2 is a graph depicting both the SCR gate voltage and the SCR cathode voltage at 2400 rpm in a small, single cylinder internal combustion engine. As depicted in FIG. 2, the SCR gate voltage is substantially the same as the SCR cathode voltage during the first portion of the negative half-cycle of the alternating signal. As a result, the SCR remains off. After the SCR gate voltage and the SCR cathode voltage reach their respective negative peaks, the voltage applied to the SCR cathode swings positively more slowly than the voltage applied to the SCR gate. At low engine speeds, this voltage differential does not become sufficiently high to switch the SCR on until the control winding output signal becomes positive with respect to ground. This delay in switching the SCR on provides an angular timing delay at low engine speeds, while the engine is warming up. As engine speed increases, the SCR is gated on progressively earlier along with positive-going slope of the control winding output signal, resulting in a continuous advance in ignition timing as engine speed increases.

Figure 3:
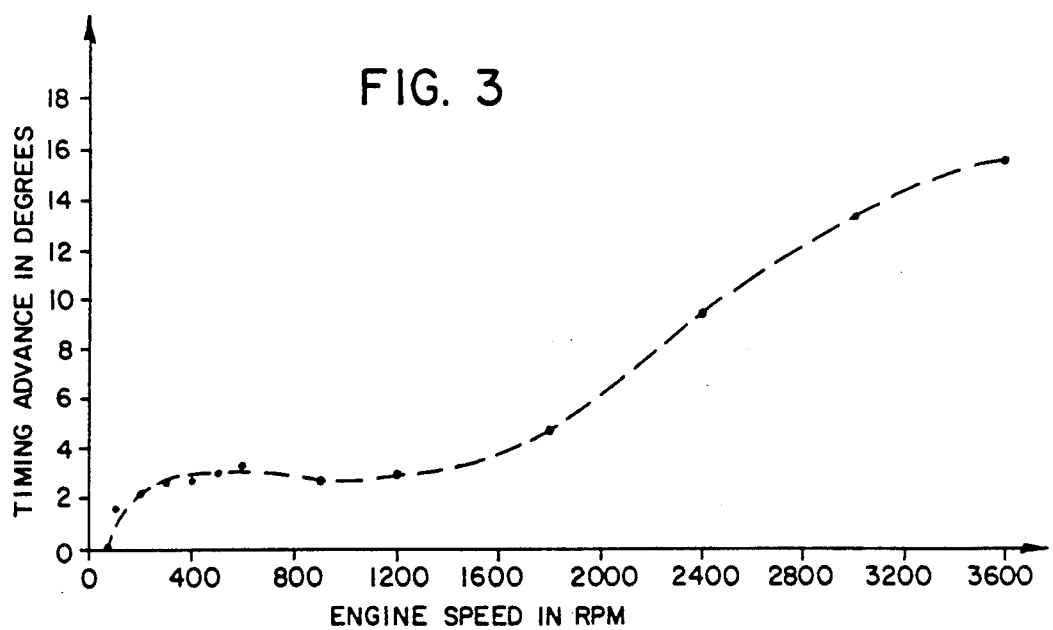
FIG. 3 is a graph depicting timing advance versus engine speed, compiled from test results of a device incorporating the present invention.

FIG. 3 is a graph depicting timing advance versus engine speed for an ignition system incorporating the present invention. The actual device used to generate the test results depicted in FIG. 3 was an engine manufactured by Briggs & Stratton with a 5.75 inch diameter flywheel using a control winding having 450 turns on a two-pole stator frame, with a 0.012 inch stator-to-magnet air gap.

The particular values of the components used to generate the test data depicted in FIG. 3 are listed in the following chart. The component labels in the chart correspond to the components depicted and described in connection with FIG. 1.

| COMPONENT | VALUE |
| --- | --- |
| R1 | 68 ohms |
| R2 | 470 ohms |
| R3 | 100 ohms |
| R4 | 330 ohms |
| R5 | 12 ohms |
| C1 | 0.56 microfarads |

As shown in FIG. 3, the ignition timing advances nearly 16 degrees from 80 rpm to 3600 rpm. Note that the curve depicted in FIG. 3 is relatively smooth, indicating continuous timing advance. This continuous timing advance helps improve engine startability as well as engine performance throughout its complete operating speed range.

Figure 1:
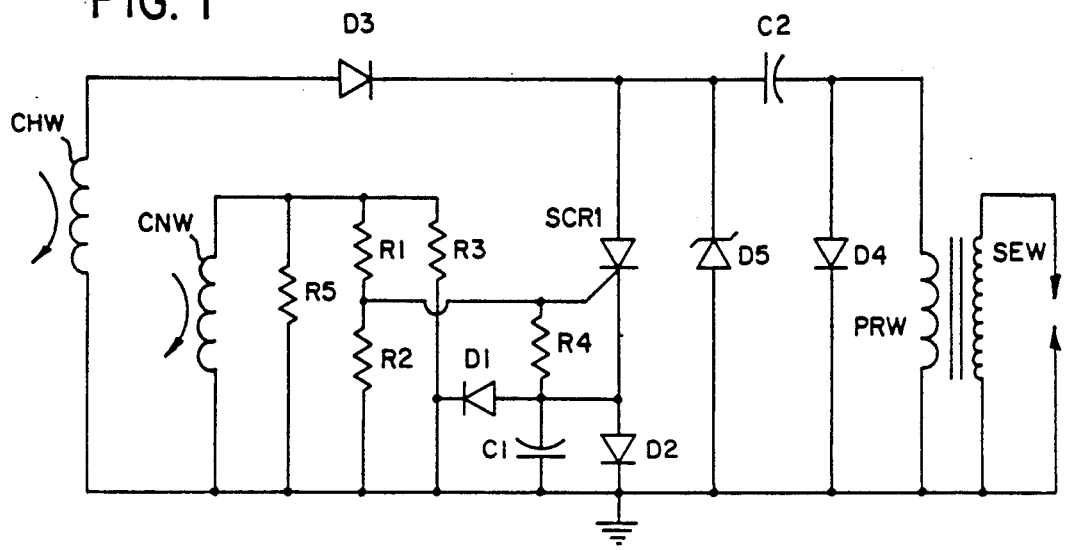
FIG. 1 is a schematic diagram of a capacitive discharge ignition system incorporating the present invention.

The operation of the capacitive discharge ignition system will be described in connection with the preferred embodiment depicted in FIG. 1. In FIG. 1, voltage is generated when a rotating magnet group carried on a flywheel (not shown) passes charging winding CHW. When the voltage is of the proper polarity, ignition charge capacitor C2 is charged through diodes D3 and D4. Diode D3 also prevents charge capacitor C2 from discharging back through charging winding CHW.

Charge capacitor C2 remains fully charged until silicon-controlled rectifier SCR1 is gated on by the timing-advance gate control circuitry discussed below. At that time, capacitor C2 discharges through rectifier SCR1, diode D2, and primary winding PRW of the output coil. This creates a high voltage spike across the primary winding and, through transformer action, creates a very high voltage across secondary winding SEW of the output coil. The high voltage across the output coil causes the firing of a spark plug (not shown) connected across secondary winding SEW.

Although rectifier SCR1 is typically a Motorola MCR 506-4 or equivalent, the exact SCR requirements may depend upon the type of output coil used, the value of ignition charge capacitor C2, as well as whether the voltage of capacitor C2 is clamped by an optional zener diode D5. Use of zener diode D5 makes it possible to use a charge capacitor C2 and a control rectifier SCR1 with lower voltage ratings, as well as providing a constant secondary winding voltage output at increased engine speeds.

The gate control circuitry depicted in FIG. 1 includes a control winding CNW which produces an alternating voltage signal in response to the rotation of a magnet assembly (not shown). For optimal system performance, charging winding CHW and control winding CNW should not be located on the same pole of the engine's stator. The two windings should preferably be positioned such that the system's charge capacitor C2, typically having a value of between about 0.47 to 1.0 microfarads, becomes fully charged before the first negative peak of the control winding alternating output signal. This arrangement provides maximum secondary winding voltage output throughout the engine's complete timing range.

Referring again to FIG. 1, optional resistor R5 provides filtering to smooth out the alternating signal output by control winding CNW. A smoothing capacitor could be used in place of resistor R5.

During the first or negative-going portion of the control winding output signal, capacitor C1 charges quickly through diode D1 and resistor R3. During this time, the voltage applied to the gate of control rectifier SCR1 is determined by a voltage divider consisting of resistors R1 and R2, and is virtually identical to the voltage applied to the SCR cathode. The voltage applied to the SCR cathode is controlled by capacitor C1. Since the SCR gate voltage is virtually identical to the SCR cathode voltage, the SCR remains off, preventing capacitor C2 from discharging.

After the control winding signal reaches its peak negative-going voltage, capacitor C1 acts as a phase shifter by providing a time delay period for the voltage applied to the SCR cathode. When the voltage differential between the gate of SCR1 and its cathode exceeds a predetermined value dependent upon the specifications for the control rectifier, SCR1 is gated on and provides a discharge path along with diode D2 for discharge of capacitor C2. Diode D2 is a blocking diode which assures that the negative-going signal from control winding CNW will pass through capacitor C1.

The ignition system resets between engine flywheel revolutions since the current through SCR1 is not continuous.

For improved circuit temperature compensation characteristics, a constant-voltage diode or zener diode (not shown) may be added in series with the gate of SCR1. Alternatively, resistor R4 may be replaced with a series and/or parallel combination of resistances that uses a thermistor (temperature-sensitive resistor) as one resistive component.

Although particular preferred embodiments of the present invention have been shown and described, it will be apparent to those skilled in the art that modifications may be made without departing from the spirit and scope of the present invention. Specifically, the phase shifter including capacitor C1 could be replaced by another timing means to provide a timing delay period for the signal applied to the cathode of switch SCR1. In addition, the present invention may be used with any capacitive discharge ignition system which has a separate control winding. Thus, the present invention is not limited to the specific capacitive discharge system depicted and described in connection with FIG. 1. Therefore, the scope of the present invention is to be limited only by the following claims.

I claim:

1. An advancing capacitive discharge ignition system for use with an internal combustion engine, comprising:
   a charge capacitor whose discharge triggers ignition firing;
   an ignition SCR in circuit connection with said charge capacitor and having a gate, an anode and a cathode, said charge capacitor discharging through said ignition SCR; 0 a control winding that generates an alternating signal waveform having positive and negative half-cycles; and
   gate control means for receiving said alternating signal and for gating on said ignition SCR during said positive half-cycle at low engine speeds and for gating on said ignition SCR during said negative half-cycle at high engine speeds, said gate control means gating on said ignition SCR progressively earlier in a substantially continuous manner along said alternating signal waveform as engine speed increases to achieve timing advance.

2. The advancing ignition system of claim 1, further comprising:
   smoothing means in circuit connection with said control winding for smoothing said alternating signal.

3. The advancing ignition system of claim 2, wherein said smoothing means includes a resistor connected in parallel with said control winding.

4. The advancing ignition system of claim 1, further comprising:
   a diode in series with said ignition SCR that provides a discharge path for said charge capacitor when said SCR is gated on.

5. The advancing ignition system of claim 1, wherein said gate control means includes:
   circuit means for applying a first control signal, functionally related to said control winding signal, to the gate of said ignition SCR; and
   phase shifter means for receiving a second signal functionally related to said control winding signal and for outputting a second control signal after an angular delay to the cathode of said ignition SCR;
   whereby said ignition SCR is gated on to discharge said charge capacitor when the differential between said first control signal and said second control signal reaches a predetermined value.

6. The advancing ignition system of claim 5, wherein said circuit means includes a voltage divider.

7. The advancing ignition system of claim 5, wherein said phase shifter means includes a second capacitor.

8. The advancing ignition system of claim 7 wherein said second capacitor receives and is charged by said second signal during the negative-going portion of said alternating signal, and discharges to output said second control signal during the positive-going portion of said alternating signal.

9. The advancing ignition system of claim 5, wherein said angular delay is longer at low engine speeds than at high engine speeds.

10. In a capacitive discharge ignition system for use with an internal combustion engine, said system including a charge capacitor whose discharge triggers ignition firing, a control winding that generates an alternating signal waveform having negative-going and positive-going portions, and an ignition SCR having a gate, an anode and a cathode, the improvement comprising:
    gate control means for controlling the discharge of said charge capacitor by controlling the gating on of said ignition SCR, said gate control means including:
    circuit means for applying a first control signal functionally related to said control winding signal to the gate of said ignition SCR; and
    phase shifter means for receiving a second signal functionally related to said control winding signal and for outputting a second control signal after an angular delay to the cathode of said ignition SCR;
    whereby said ignition SCR is gated on to discharge said charge capacitor when the differential between said first control signal and said second control signal reaches a predetermined value.

11. The ignition system of claim 10, further comprising:
    smoothing means in circuit connection with said control winding for smoothing said alternating signal.

12. The ignition system of claim 11, wherein said smoothing means includes a resistor connected in parallel with said control winding.

13. The ignition system of claim 10, further comprising:
    a diode in series with said ignition SCR to provide a discharge path for said charge capacitor when said SCR switches on.

14. The ignition system of claim 10, wherein said circuit means includes a voltage divider.

15. The ignition system of claim 10, wherein said phase shifter means includes a second capacitor.

16. The ignition system of claim 10, wherein said second capacitor receives and is charged by said second signal during the negative-going portion of said alternating signal waveform, and discharges to output said second control signal during the positive-going portion of said alternating signal waveform.

17. The ignition system of claim 10, wherein said angular delay is greater at low engine speeds than at high engine speeds.

* * * * *

UNITED STATES PATENT AND TRADEMARK OFFICE
CERTIFICATE OF CORRECTION

PATENT NO. : 5,024,204

DATED : June 18, 1991

INVENTOR(S) : RICHARD A. DYKSTRA

It is certified that error appears in the above-identified patent and that said Letters Patent is hereby corrected as shown below:

Column 5, Line 28, Claim 1, after "SCR;" and before "a" delete "0".

Signed and Sealed this

Thirteenth Day of October, 1992

Attest:

DOUGLAS B. COMER

Attesting Officer

Acting Commissioner of Patents and Trademarks